United States Patent [19]

Kondos et al.

[11] Patent Number: 5,091,160

[45] Date of Patent: Feb. 25, 1992

[54] USE OF MICROWAVE RADIATION TO ELIMINATE FOAM IN ORE LEACHING

[75] Inventors: Peter D. Kondos; Kazi E. Haque, both of Ottawa; John C. MacDonald, Nepean; Wesley F. Griffith, Gloucester; Daniel Laforest, Nepean; Joe Iuliano, Brampton, all of Canada

[73] Assignee: Her Majesty the Queen in right of Canada, as represented by the Minister of Energy, Canada

[21] Appl. No.: 608,684

[22] Filed: Nov. 5, 1990

[51] Int. Cl.$^5$ .............................................. C01F 1/00
[52] U.S. Cl. ................................... 423/131; 423/132; 423/127; 423/134; 423/624
[58] Field of Search ............... 423/111, 122, 131, 127, 423/132, 134, 128, 624

[56] References Cited

U.S. PATENT DOCUMENTS

| | | | |
|---|---|---|---|
| 1,823,864 | 9/1931 | Sawyer et al. | 423/132 |
| 3,116,110 | 12/1963 | Morana | 423/128 |
| 3,615,260 | 10/1971 | Hanson | 423/131 |
| 3,669,649 | 6/1972 | Olson et al. | 423/132 |
| 3,685,961 | 8/1972 | Grunig et al. | 423/127 |
| 3,699,208 | 11/1972 | Grunig et al. | 423/132 |
| 3,704,091 | 11/1972 | Grunig et al. | 423/132 |
| 3,716,616 | 2/1973 | Lin | 423/111 |
| 3,729,387 | 4/1973 | Naschke et al. | 203/19 |
| 4,434,142 | 2/1984 | Huckabay | 423/111 |
| 4,729,881 | 3/1988 | Copenhafer | 423/127 |

FOREIGN PATENT DOCUMENTS 1259775 9/1989 Canada .
0158461 10/1985 European Pat. Off. .

Primary Examiner—Theodore Morris
Assistant Examiner—Edward Squillante
Attorney, Agent, or Firm—Jones, Tullar & Cooper

[57] ABSTRACT

A method of eliminating the foam above a slurry of a corrosive liquid and solid matter where the foam is caused by a gas evolved by the reaction between the heated corrosive liquid and the solid matter comprising providing the heating energy by microwaves. This method has been found to be particularly useful in the sulphuric acid leaching of an ore concentrate in the production of beryllium hydroxide.

2 Claims, 7 Drawing Sheets

USE OF MICROWAVE RADIATION TO ELIMINATE FOAM IN ORE LEACHING

BACKGROUND OF THE INVENTION

The present invention relates to a method for the elimination of foam formation in chemical processes and in particular, to the elimination of foam formation in leaching of an ore concentrate in heated concentrated sulphuric acid by using microwaves to raise the temperature of the slurry.

Many procedures, generally multi-step processes, have been developed to extract valuable commodities from crude ore. Chemical extraction processes comprise a series of steps in which the ore concentrate is treated with various reagents under specific conditions to selectively extract the values contained therein. In such chemical extraction processes, there are steps which include leaching the ore concentrate in corrosive solutions such as sulphuric acid. These reactions may produce gaseous products which may in turn form a corrosive foam above the slurry. This foam can cause serious operational problems, in particular, enhanced corrosion of the reaction vessels. In the production of beryllium hydroxide from ore concentrate, for example, the ore is treated with concentrated sulphuric acid at 240° C. This treatment produces gaseous products, namely, carbon dioxide and silicon tetrafluoride which produce a foam above the slurry. The foam is generally controlled by the addition of defoaming agents and/or controlled heat input.

The method of the subject invention provides the novel step of heating the mixture by microwaves to control and eliminate the formation of a foam. This method eliminates the need for defoaming agents and/or controlled heat input.

In U.S. Pat. No. 4,582,629, Wolf discloses the use of microwaves in enhancing the separation of an oil/water emulsion. Although, in principle, there are similarities, between emulsions and foams, as pointed out by A. Prins, in "Advances in Food Emulsions and Foams" (Dickinson and Stainsby, Elsevier Applied Science) at pages 91-92, there are several quantitative differences between them, from a physical standpoint.

SUMMARY OF THE INVENTION

The subject invention therefore provides a method of controlling and eliminating the formation of foam above a slurry comprising a corrosive liquid and solid matter where heating of the slurry produces a gas by providing the heating energy with microwaves. In particular, in a process of isolating beryllium hydroxide from ore in which a concentrate of the ore is leached in concentrated sulphuric acid heated to a temperature of about 240° C., the invention provides a method of eliminating foam formation comprising the step of elevating the temperature of the sulphuric acid to about 240° C. by irradiation with microwaves.

BRIEF DESCRIPTION OF DRAWINGS

The method of the invention will now be described in greater detail with references to the following drawings in which.

DETAILED DESCRIPTION OF INVENTION

Figure 1:
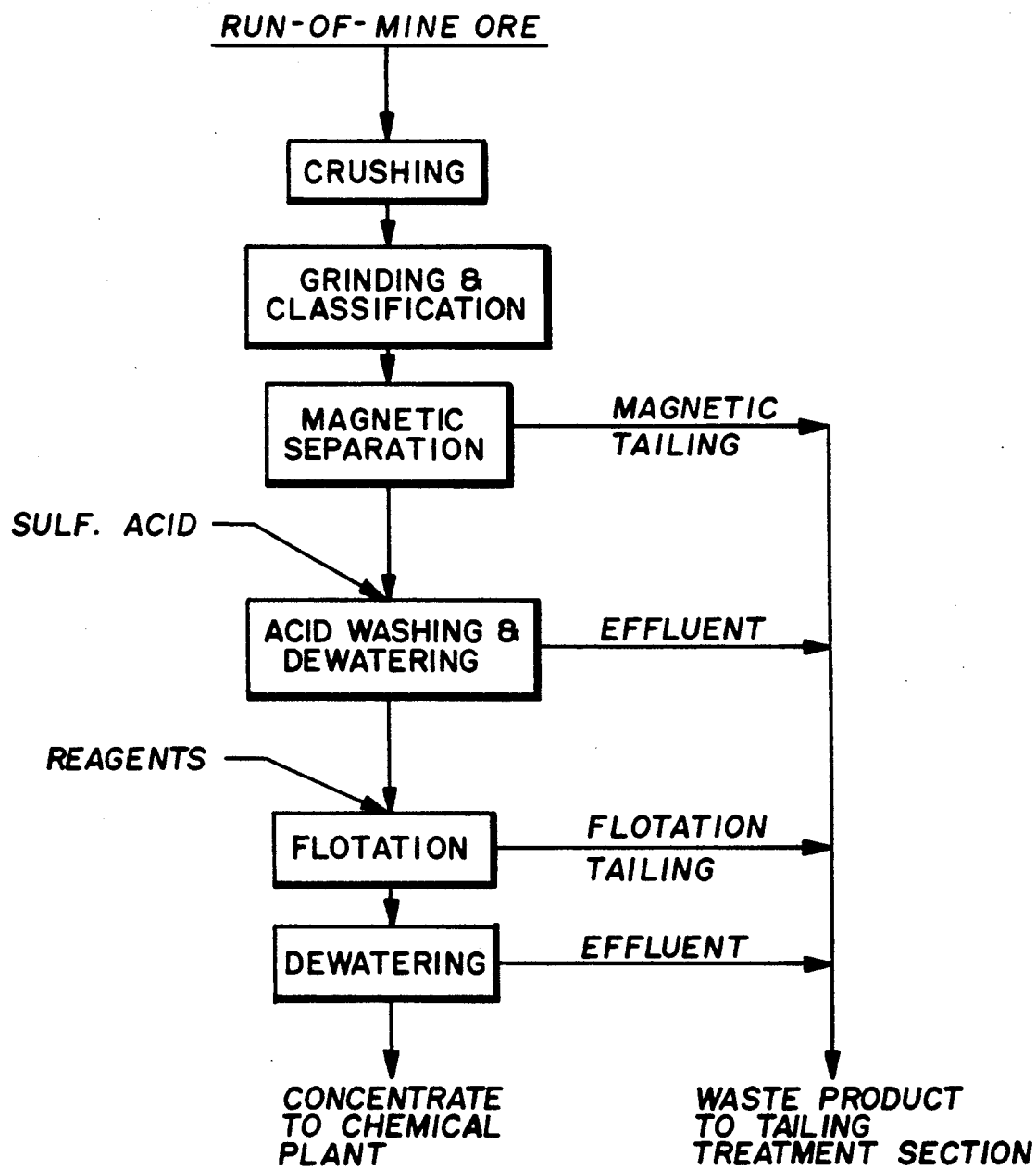
FIG. 1 shows a flowsheet of a typical concentration process for an ore.
Figure 2:
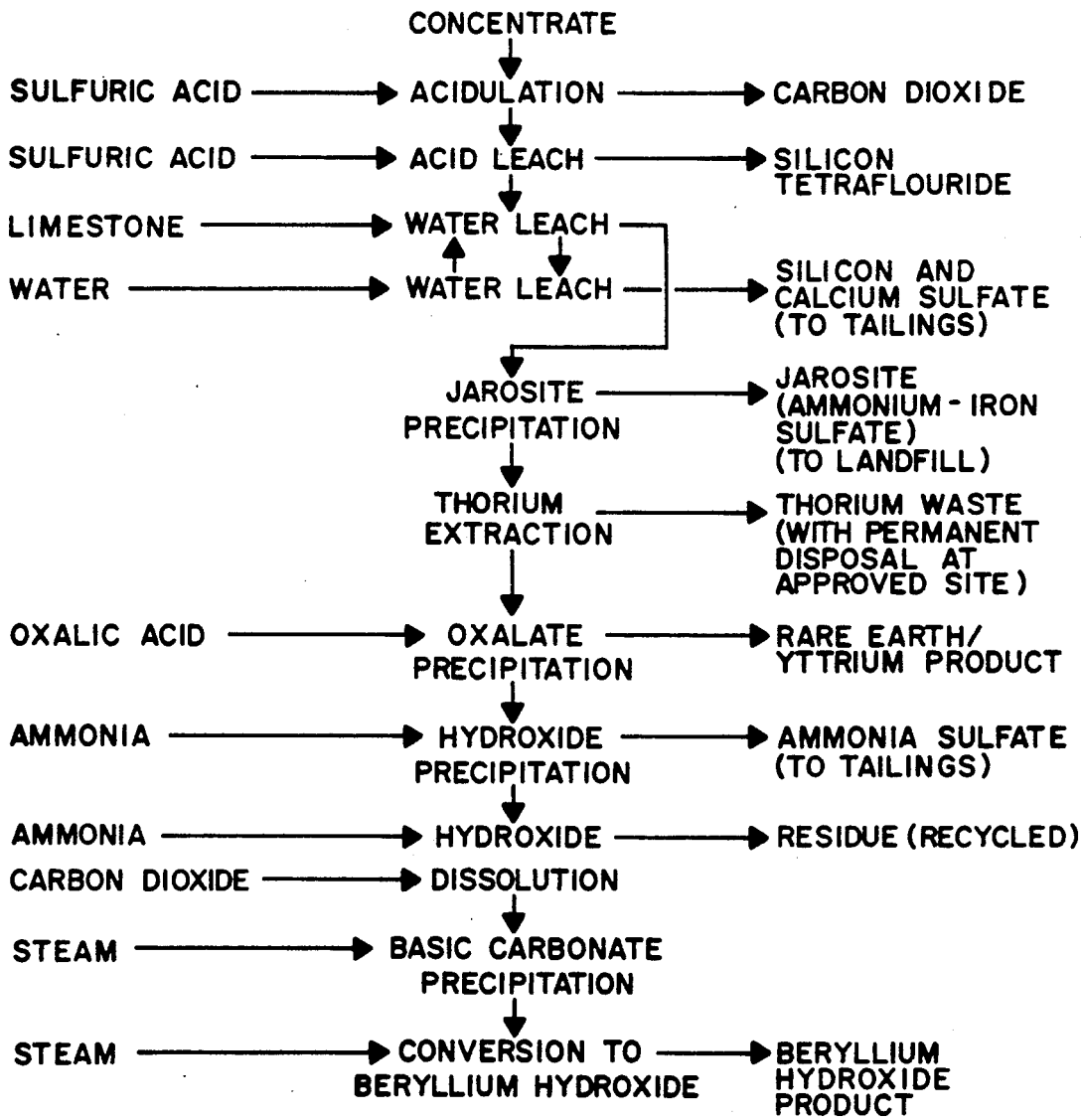
FIG. 2 shows a flowsheet of a typical chemical extraction process of an ore concentrate.

FIGS. 1 and 2 depict a flowsheet of a typical ore concentration and extraction process. In the particular flowsheets shown, the target compound is beryllium hydroxide. A different extraction sequence with different reagents and conditions would be used to isolate different target compounds. Such industrial processes are known.

What many of such processes have in common, are extraction steps where the ore is treated with a corrosive agent at elevated temperatures resulting in the evolution of a gaseous product. A typical example is shown in FIG. 2 at the second stage of chemical treatment, namely, the acid leach. In this process, the ore is treated with sulphuric acid heated to 240° C. One of the products of this treatment is gaseous silicon tetrafluoride. Where heat is applied by conventional methods, the released gas forms a foam on the surface of the slurry which accelerates corrosion of the reaction vessel and hampers further processing. Currently adopted methods of controlling the formation of this foam include addition of defoaming agents and/or controlled heat-input to the chemical reactants.

The method of the invention is demonstrated in the following examples:

EXAMPLE 1

50 gm of an ore concentrate were slurried in 168 ml of 85% $H_2SO_4$. The reaction vessel was placed inside a microwave oven and fitted with a mechanical stirrer and a K-type thermocouple. The thermocouple was well protected to withstand the harsh leach conditions. Temperature was monitored by a digital thermometer and temperature recorder. The microwave oven, Model BPH-6000-P4-SP* manufactured by Cober Electronic Inc., was equipped with 6×1 kW power magnetrons and a variable power adjustment device for the generation of continuous or pulse mode microwaves. The frequency of the microwaves was 2450 MHz.

*Trademark

Figure 3:
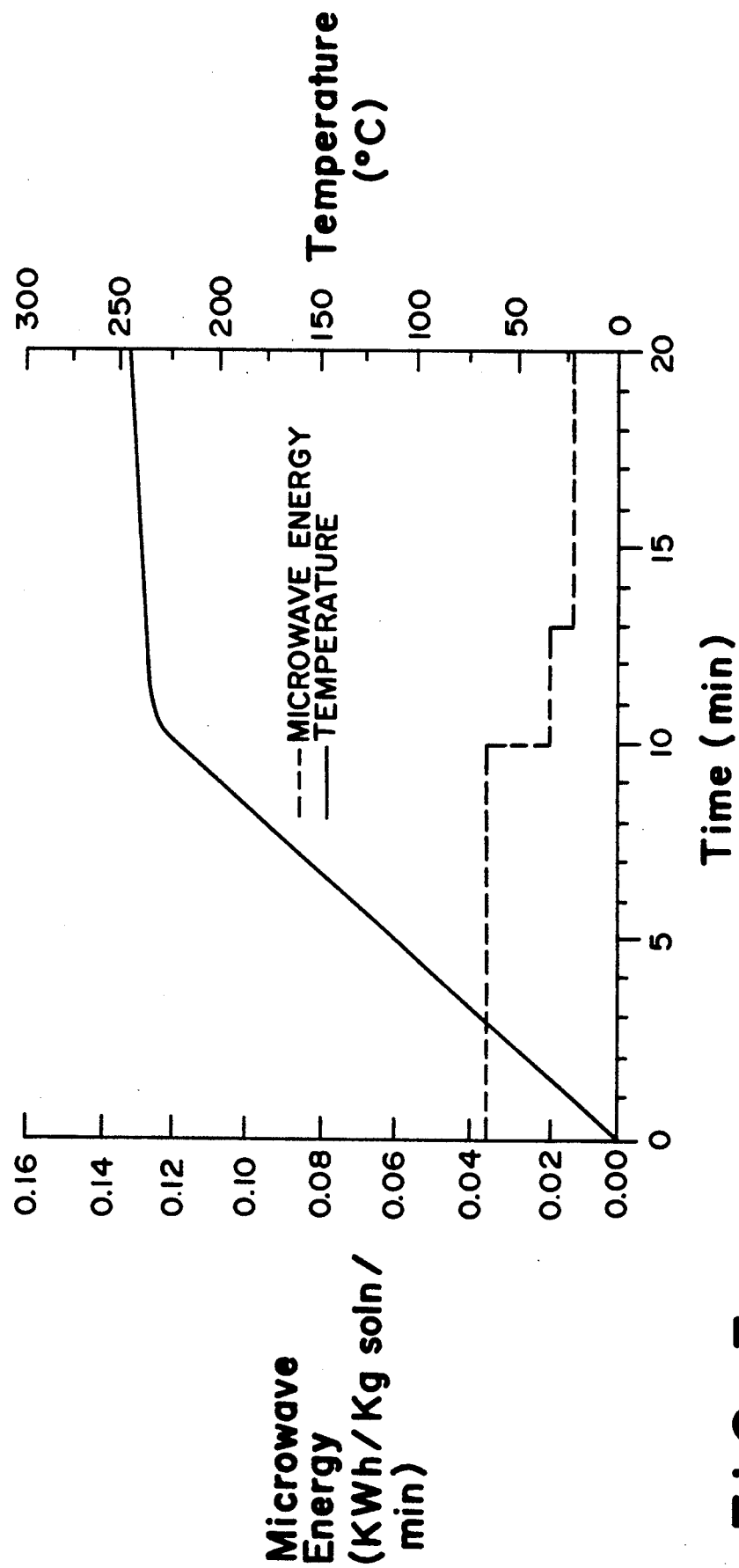
FIGS. 3 and 4 show the temperature profile of a slurry comprising 50 gms of ore concentrate and 168 mls of concentrated sulphuric acid and the microwave energy input.

The temperature profile of the slurry and the microwave energy input are shown in FIG. 3. The initial heating time was 3.5 minutes at a microwave energy input of 0.14 kWh/Kg sol'n/min. followed by a step down to approximately 0.047 kWh/Kg sol'n/min.

EXAMPLE 2

Figure 4:
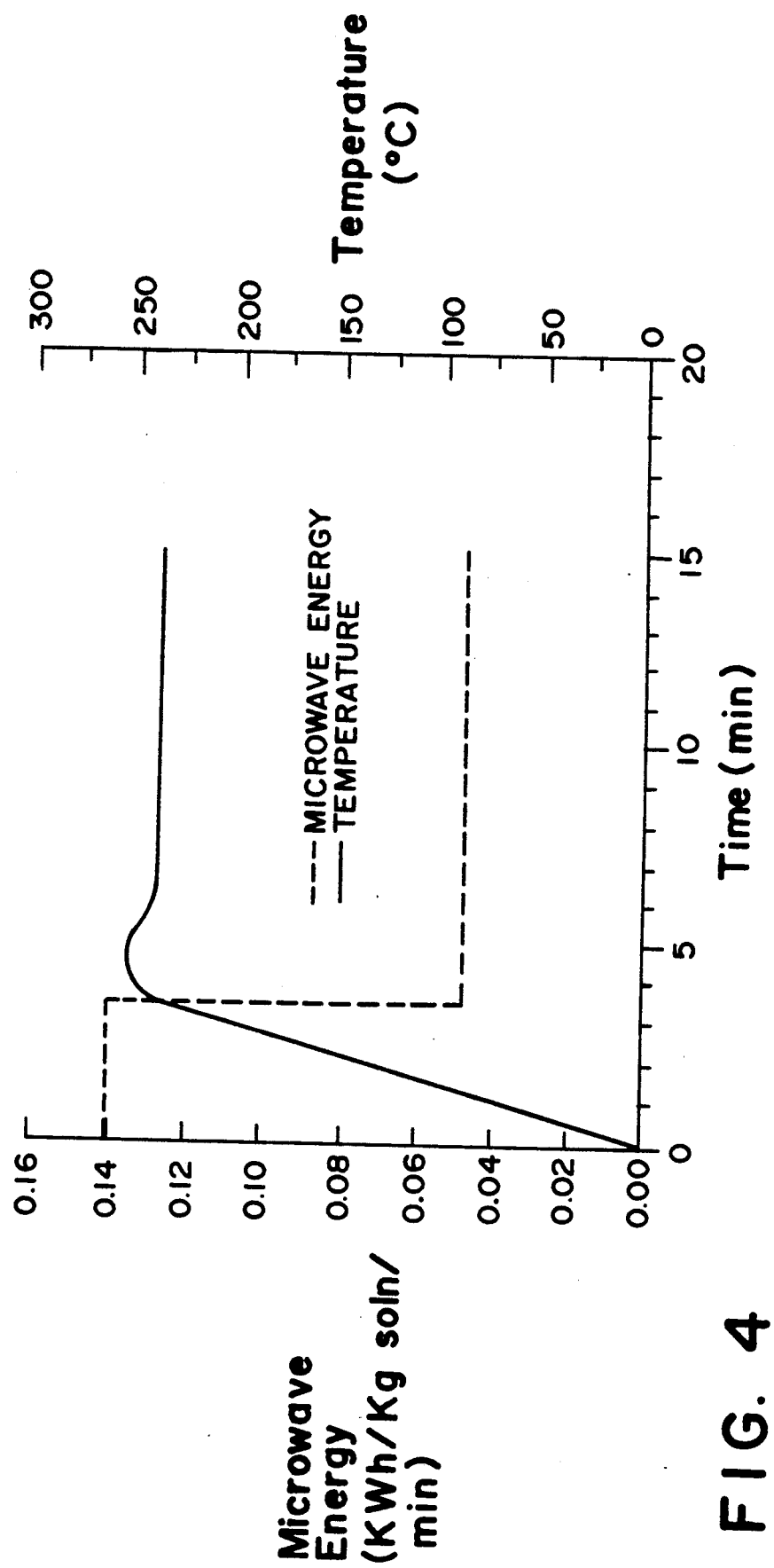

The procedure was identical to that of Example 1 except that the microwave energy input was varied as shown in FIG. 4.

EXAMPLE 3

Figure 5:
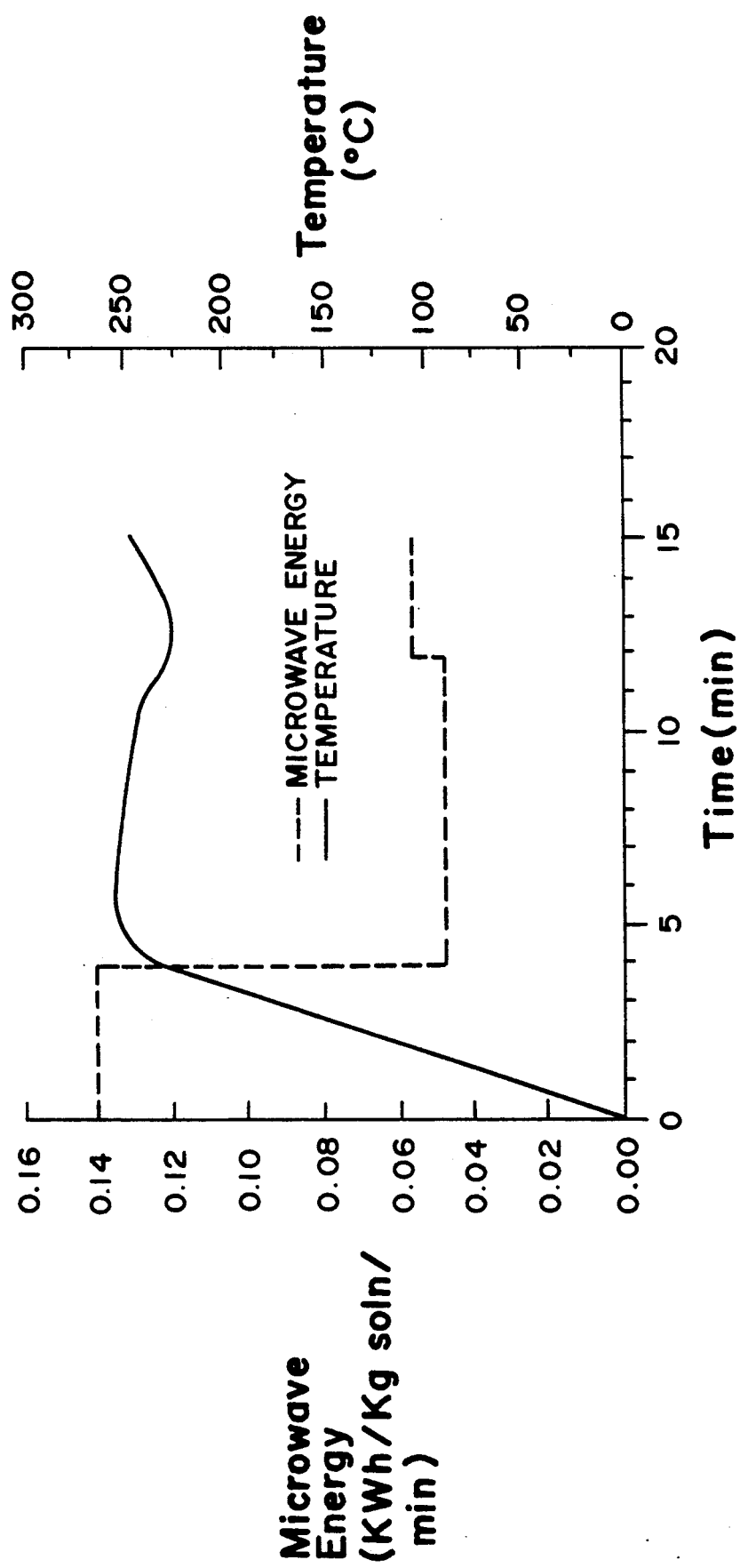
FIGS. 5 and 6 show the temperature profile of a slurry of 100 gms of ore concentrate in 336 mls of concentrated sulphuric acid and the microwave energy input.

The procedure of Example 1 with the following changes: ore concentrate sample size: 100 gm
volume of 85% $H_2SO_4$: 336 ml
microwave energy input: as shown in FIG. 5

EXAMPLE 4

Figure 6:
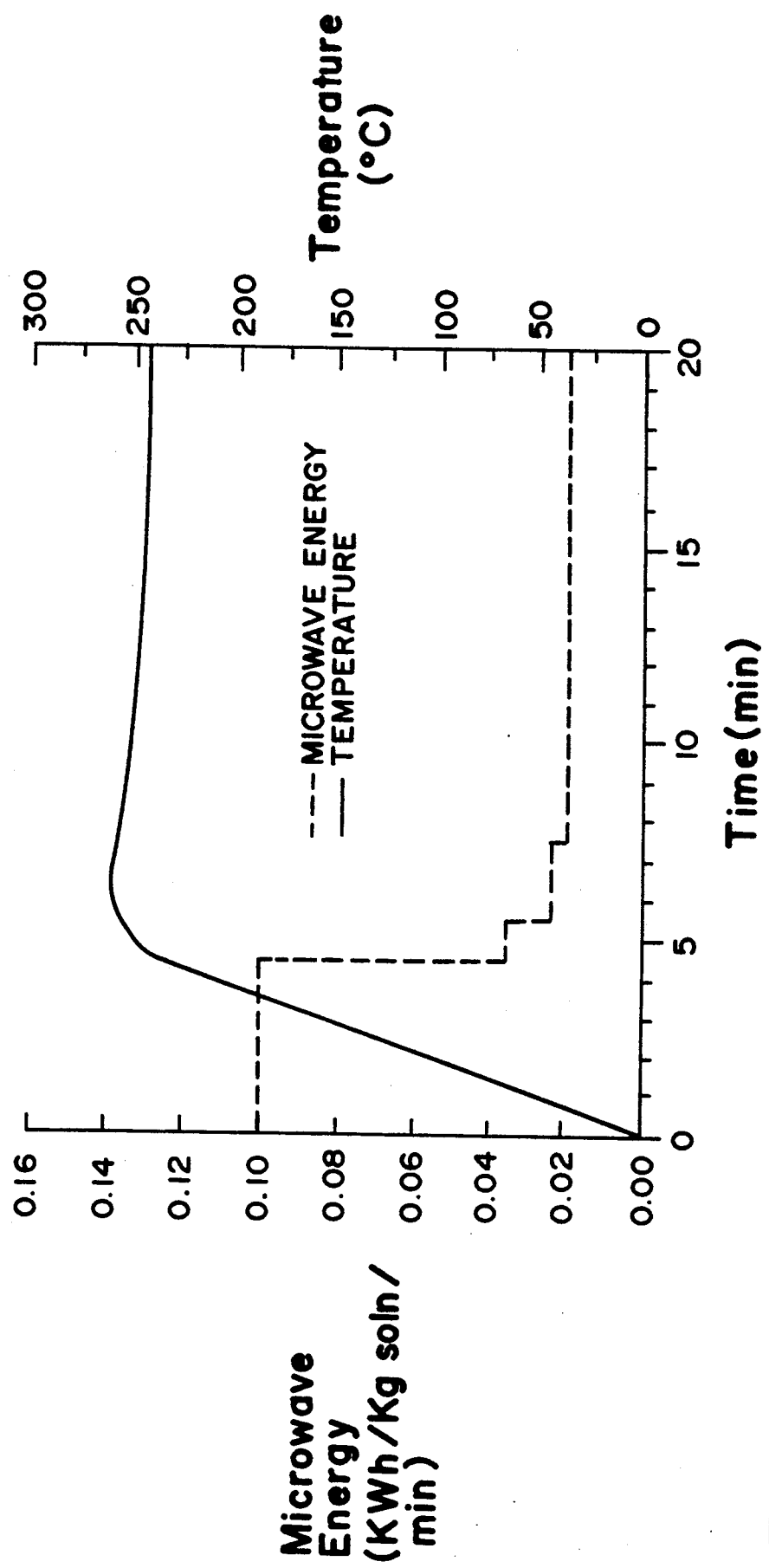

The procedure of Example 3 with the following change: microwave energy input: as shown in FIG. 6

EXAMPLE 5

Figure 7:
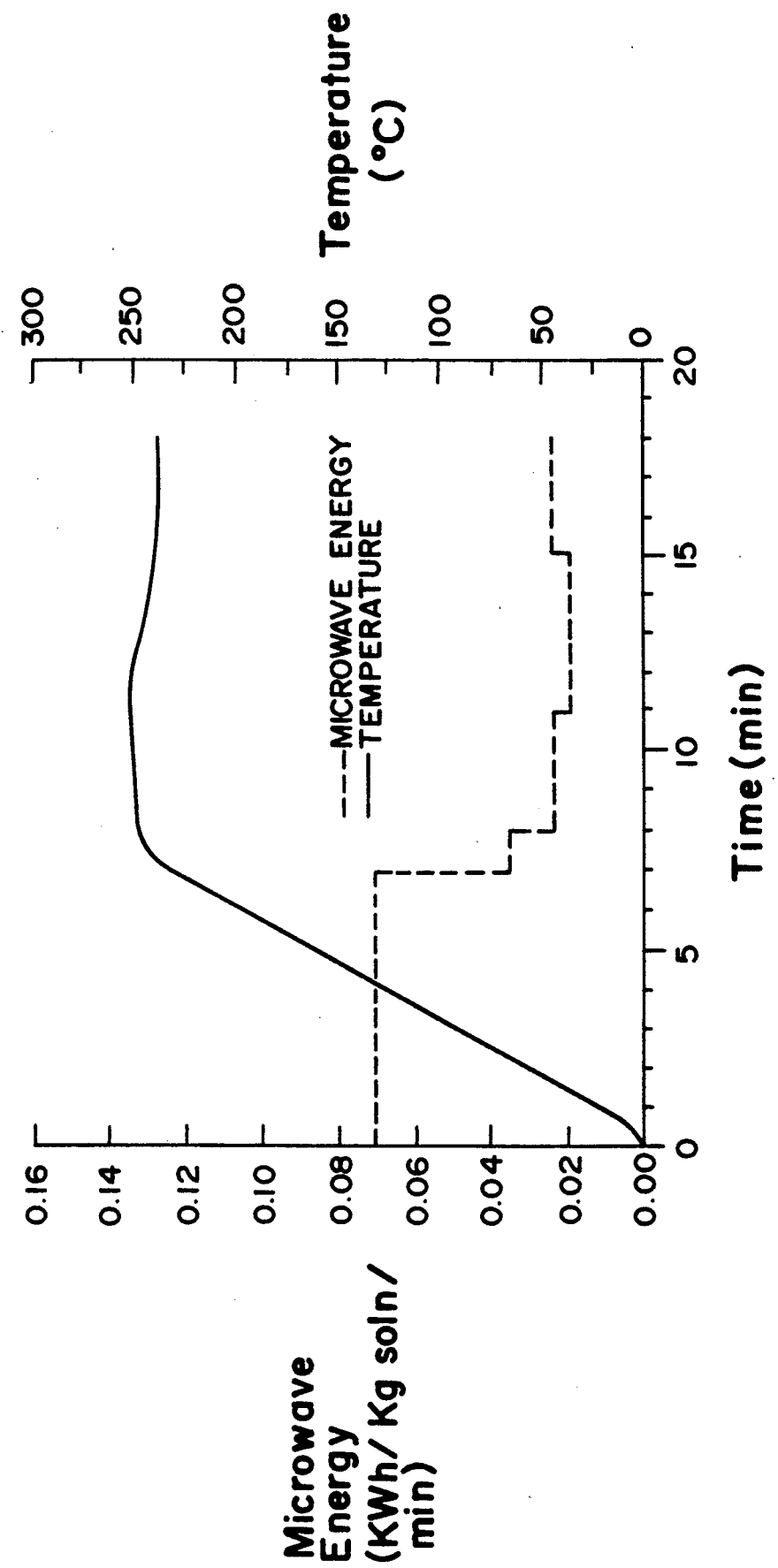
FIG. 7 shows the temperature profile of a slurry of 200 gms of ore concentrate in 772 mls of concentrated sulphuric acid and the microwave energy input.

The procedure of Example 1 with the following changes: ore concentrate sample size: 200 gm
volume of 85% $H_2SO_4$: 772 ml
microwave energy input: as shown in FIG. 7

Table 1 provides a summary of the results of the five examples described above.

TABLE 1

Microwave Energy Requirements for the Phenakite Leaching

| Concentrate (g) | $H_2SO_4$ (mL) | $H_2O$ (mL) | Kettle size (mL) | Initial heating time (min) | MW energy to reach 240° C. (kWh/kg soln) | MW energy to maintain 240° C. (kWh/kg soln/min) |
| --- | --- | --- | --- | --- | --- | --- |
| 50 | 164 | 4 | 500 | 3.5 | 0.49 | 0.047 |
| 50 | 164 | 4 | 500 | 4.0 | 0.56 | 0.049 |
| 100 | 328 | 8 | 2000 | 4.5 | 0.47 | 0.020 |
| 100 | 328 | 8 | 2000 | 8.0 | 0.53 | 0.021 |
| 200 | 656 | 16 | 4000 | 13.0 | 0.40 | 0.012 |

In all five examples described, a foam formed on initial preparation of the slurry rapidly disappeared on irradiation of the solution with microwaves.

For use of the method of this invention on an industrial scale, the microwave energy can be applied through a wave guide mounted to the top or side of the reaction vessel. It is to be noted that the microwave energy input requirement to elevate and maintain the slurry at the target temperature of 240° C. will vary with the design of the oven and the vapour loss from the reaction slurry.

It is understood that certain variations and modifications of the invention may be made by those skilled in the art without departing from the spirit and scope of this invention. It is further understood that the invention was disclosed with reference to specific examples which are illustrative of the invention and not intended to limit the scope thereof which is defined in the following claims.

We claim:

1. A method for leaching beryllium hydroxide from a crude ore containing said beryllium hydroxide comprising:

(a) forming an ore concentrate from said crude ore;
   (b) mixing said concentrate with a sulphuric acid to form a slurry, whereby reaction of said acid with said concentrate produces gaseous reaction products which form an undesirable corrosive foam layer on the surface of said slurry; and
   (c) eliminating said undesirable foam layer and heating said slurry by irradiation with microwaves.

2. A method in accordance with claim 1 wherein the frequency of said microwave irradiation is 2450 MHz.

* * * * *

UNITED STATES PATENT AND TRADEMARK OFFICE
CERTIFICATE OF CORRECTION

PATENT NO. : 5,091,160
DATED : February 25, 1992
INVENTOR(S) : Kondos et al

It is certified that error appears in the above-identified patent and that said Letters Patent is hereby corrected as shown below:

On the title page:
Item: [75] Inventors: please correct the name of the third listed inventor from "John C. MacDonald" to --Raymond J.C. MacDonald--.

Signed and Sealed this

Second Day of November, 1993

Attest:

BRUCE LEHMAN

Attesting Officer

Commissioner of Patents and Trademarks